No. 623,777. Patented Apr. 25, 1899.
W. A. FREISE.
PACK SADDLE FILTER.
(Application filed June 23, 1898.)
(No Model.)
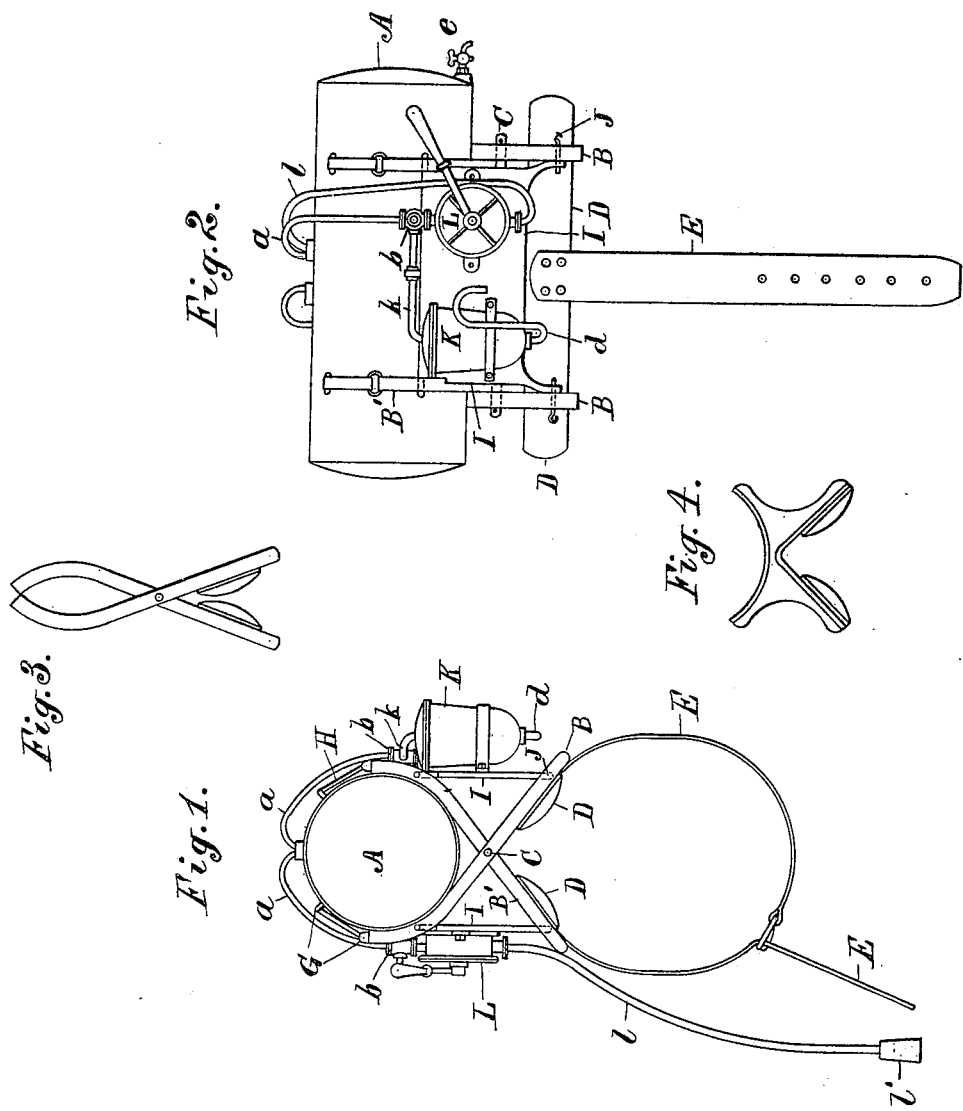
Attest:
L. Lee.
Edw. F. Kinsey.
Inventor.
William A. Freise, per
Thomas S. Crane, Atty.
THE NORRIS PETERS CO., PHOTO-LITHO., WASHINGTON, D. C.

UNITED STATES PATENT OFFICE.

WILLIAM A. FREISE, OF NEWARK, NEW JERSEY.

PACK-SADDLE FILTER.

SPECIFICATION forming part of Letters Patent No. 623,777, dated April 25, 1899.

Application filed June 23, 1898. Serial No. 684,263. (No model.)

*To all whom it may concern:*

Be it known that I, WILLIAM A. FREISE, a citizen of the United States, residing at Newark, county of Essex, State of New Jersey, have invented certain new and useful Improvements in Pack-Saddle Filters, fully described and represented in the following specification and the accompanying drawings, forming a part of the same.

The object of this invention is to provide a portable filtering apparatus combined with a pack-saddle, but adapted to set upon the ground and to use in that position when not in transportation. To effect this object, I form a jointed frame like the frame of a camp-stool and support the tank between the upper arms of the frame, to which it is secured by suitable straps or fastenings. With such construction the lower legs of the frame may be provided with pads to form a pack-saddle and serve also to support the apparatus upon the ground. A pump and filter are attached to the frame, and the pump is provided with connections to draw water from any suitable source and discharge it into the tank, or, when the tank is filled, to draw water therefrom and discharge it through the filter.

The invention will be understood by reference to the annexed drawings, in which—

Figure 1 is an end elevation of the apparatus provided with two pumps and filters. Fig. 2 is a side elevation of the apparatus, and Fig. 3 is an end elevation of the frame collapsed for packing.

A designates the tank, of cylindrical form, and B B' the side bars of the frame, jointed by a longitudinal bar C. Pads D are fixed to the inner sides of the bars, near their lower ends, to rest upon the back of a horse or mule, and straps E are attached to the pad to form a girth around the animal's body. The upper ends of the bars are preferably curved to fit the sides of the tank, and staples G are provided upon the ends of the bars and the tank, with straps H to hold the same together, thus holding the tank securely upon the frame. In packing such articles for transportation to the place where they would be used the tank may be readily detached from the frame and the latter collapsed.

A board I is hinged to the upper parts of the frame-bars and secured by pins J to their lower parts, and the filter K and pump L are attached to such board. Such a board, with its appliances, is shown in Fig. 1 fixed upon each side of the frame to permit the use of the apparatus by more than one person at once.

The pump in Fig. 2 is shown provided at its outlet upon the top with a three-way valve *b*, which is connected upon the top with the inlet of the tank and upon the side with the inlet of the filter by pipes *a* and *k*, respectively.

The pump is provided at its inlet upon the bottom with a hose connection *l*, adapted to draw water from any convenient source when filling the tank or to draw water from the tank when supplying the filter.

In Fig. 2 the connections are shown arranged to draw water from the tank and pump it through the filter, from which it is discharged by pipe *d*. The hose *l* is shown at the left side of Fig. 1 extended downwardly and provided upon the end with a body *l'* to represent a strainer. Such strainer may be made of any suitable character to adapt the hose for drawing water from a spring or brook, in which case the three-way cock may be turned to deliver the water into either the tank or the filter.

The lower ends of the frame-bars are extended a little below the pads, so as to support the apparatus when moved from the animal's back.

The apparatus is especially adapted for use by soldiers in the field or exploring parties, as the tank may be filled when the parties are passing any suitable water-supply and can be set up for use within the tent or other shelter employed in camping. A cock *e* is shown upon the end of the tank to draw water directly therefrom for washing or to empty the tank for cleansing the same.

The filters shown in the drawings are of the style patented to me November 6, 1894, with No. 528,630, which are of such materials that they may be perfectly cleansed; but any suitable filter may be used in the present apparatus.

The pump shown in the drawings is one having an oscillating wing-piston actuated by a handle L'; but any other suitable pump may be used, as the invention consists, primarily, in the combination of the tank, the pump, the filter, and their connections with a frame adapted to hold them in the proper relations for use and preferably provided with pads to form a pack-saddle.

Having thus set forth the nature of the invention, what is claimed herein is—

1. In a portable filtering apparatus, the combination, with a frame adapted for a pack-saddle, of a tank, a filter, and a pump adapted to draw water and discharge it alternatively into the tank or filter.

2. In a portable filtering apparatus, the combination, with a collapsible frame having bars jointed together, of a tank with means for supporting it upon such frame, a filter, and a pump for drawing water to fill the tank.

3. In a portable filtering apparatus, the combination of a frame having side bars pivoted together and provided with pads to form a pack-saddle, and with a board hinged to the frame, a tank with means for fastening it upon the frame, and a pump and filter secured upon the board with connections from the pump to the tank and filter, substantially as herein set forth.

4. In a portable filtering apparatus, the combination of a frame having side bars pivoted together and formed to rest upon the ground and provided with pads to form a pack-saddle, and a tank, pump and filter with means for fastening them upon the frame, and connections from the pump to the tank and filter, substantially as herein set forth.

In testimony whereof I have hereunto set my hand in the presence of two subscribing witnesses.

WILLIAM A. FREISE.

Witnesses:
　THOMAS S. CRANE,
　EDWARD F. KINSEY.